(12) United States Patent
Chiu (10) Patent No.: US 8,539,470 B2
(45) Date of Patent: Sep. 17, 2013

(54) APPARATUS AND METHOD FOR UPDATING THE FUNCTION OF MONITOR

(75) Inventor: Chih-Chiang Chiu, Taipei County (TW)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 1179 days.

(21) Appl. No.: 11/836,156

(22) Filed: Aug. 9, 2007

(65) Prior Publication Data
US 2008/0086625 A1 Apr. 10, 2008

(30) Foreign Application Priority Data
Oct. 5, 2006 (TW) .............................. 95137045 A (51) Int. Cl.
*G06F 9/44* (2006.01)
(52) U.S. Cl.
USPC ........... 717/168; 717/170; 717/171; 717/172; 717/173
(58) Field of Classification Search
None
See application file for complete search history.

(56) References Cited

U.S. PATENT DOCUMENTS

| | | | |
|---|---|---|---|
| 6,492,798 B2 * | 12/2002 | Sunter | 324/76.15 |
| 6,871,292 B1 * | 3/2005 | Fischer | 713/500 |
| 7,197,634 B2 * | 3/2007 | Kruger et al. | 717/173 |
| 7,293,169 B1 * | 11/2007 | Righi et al. | 717/171 |
| 7,363,480 B1 * | 4/2008 | Righi et al. | 713/1 |
| 7,421,688 B1 * | 9/2008 | Righi et al. | 717/172 |
| 7,581,059 B2 * | 8/2009 | Gupta et al. | 711/108 |
| 7,673,301 B1 * | 3/2010 | Righi et al. | 717/172 |
| 8,375,378 B2 * | 2/2013 | Wang et al. | 717/168 |
| 2002/0158620 A1 * | 10/2002 | Sunter | 324/76.15 |
| 2005/0076102 A1 * | 4/2005 | Chen et al. | 709/220 |
| 2005/0160257 A1 * | 7/2005 | Kruger et al. | 713/2 |
| 2006/0015845 A1 * | 1/2006 | Tomchin | 717/109 |
| 2006/0215994 A1 * | 9/2006 | Sasabe | 386/95 |
| 2007/0002347 A1 * | 1/2007 | Lai et al. | 358/1.9 |
| 2007/0028039 A1 * | 2/2007 | Gupta et al. | 711/108 |
| 2008/0005733 A1 * | 1/2008 | Ramachandran et al. | 717/168 |
| 2008/0034152 A1 * | 2/2008 | Wang et al. | 717/168 |
| 2012/0072896 A1 * | 3/2012 | Watanabe et al. | 717/170 |

OTHER PUBLICATIONS

Open Mobile Alliance; Firmware Update Management Object; 2006 Open Mobile Alliance Ltd.; 32 pages; <http://h71028.www7.hp.com/enterprise/downloads/OMADMFUMOv1.0.pdf>.*
Dennis K. Nilsson et al.; A Framework for Self-Verification of Firmware Updates over the Air in Vehicle ECUs; 2008 IEEE; 5 pages.; <http://ieeexplore.ieee.org/stamp/stamp.jsp?tp=&arnumber=4746641>.*

(Continued)

*Primary Examiner* — Thuy Dao
*Assistant Examiner* — Cuong V Luu
(74) *Attorney, Agent, or Firm* — Winston Hsu; Scott Margo (57) ABSTRACT

The present invention provides an apparatus for updating the function of a monitor and the method thereof. The method comprises: coupling a scale controller and a memory device of at least a monitor to a microcontroller; controlling the microcontroller to send a programming activation signal in a first signal format to the scale controller such that the scale controller enters a state of updating program; and controlling the microcontroller to access the memory device through a signal in a second signal format to update the program codes stored in the memory device, so as to update the function of the monitor.

14 Claims, 7 Drawing Sheets

(56) References Cited

OTHER PUBLICATIONS

Steven Hanna et al.; Take Two Software Updates and See Me in the Morning The Case for Software Security Evaluations of Medical Devices; 2011 contrib.andrew.cmu.edu; <http://www.contrib.andrew.cmu.edu/~ppoosank/papers/hanna-aed-healthsec11.pdf>.*

K. Chen; Reversing and Exploiting an Apple Firmware Update; 2009 Black Hat USA; 190 pages; <https://www.blackhat.com/presentations/bh-usa-09/CHEN/BHUSA09-Chen-RevAppleFirm-SLIDES.pdf>.*

Matthew Kiley et al.; iPod Forensics Update; 2007 International Journal of Digital Evidence; 9 pages; <http://cryptome.org/isp-spy/ipod-spy.pdf>.*

Katsuhiro Mayama et al.; Design of Firmware Update System of RT-Middleware for Embedded System; 2010 SICE; pp. 2818-2822; <http://ieeexplore.ieee.org/stamp/stamp.jsp?tp=&arnumber=5602590>.*

* cited by examiner

APPARATUS AND METHOD FOR UPDATING THE FUNCTION OF MONITOR

BACKGROUND OF INVENTION

1. Field of the Invention

The present invention relates to an apparatus and method for updating the function of a monitor, especially to an apparatus and method capable of updating functions of a plurality of monitors simultaneously.

2. Description of the Prior Art

Figure 1:
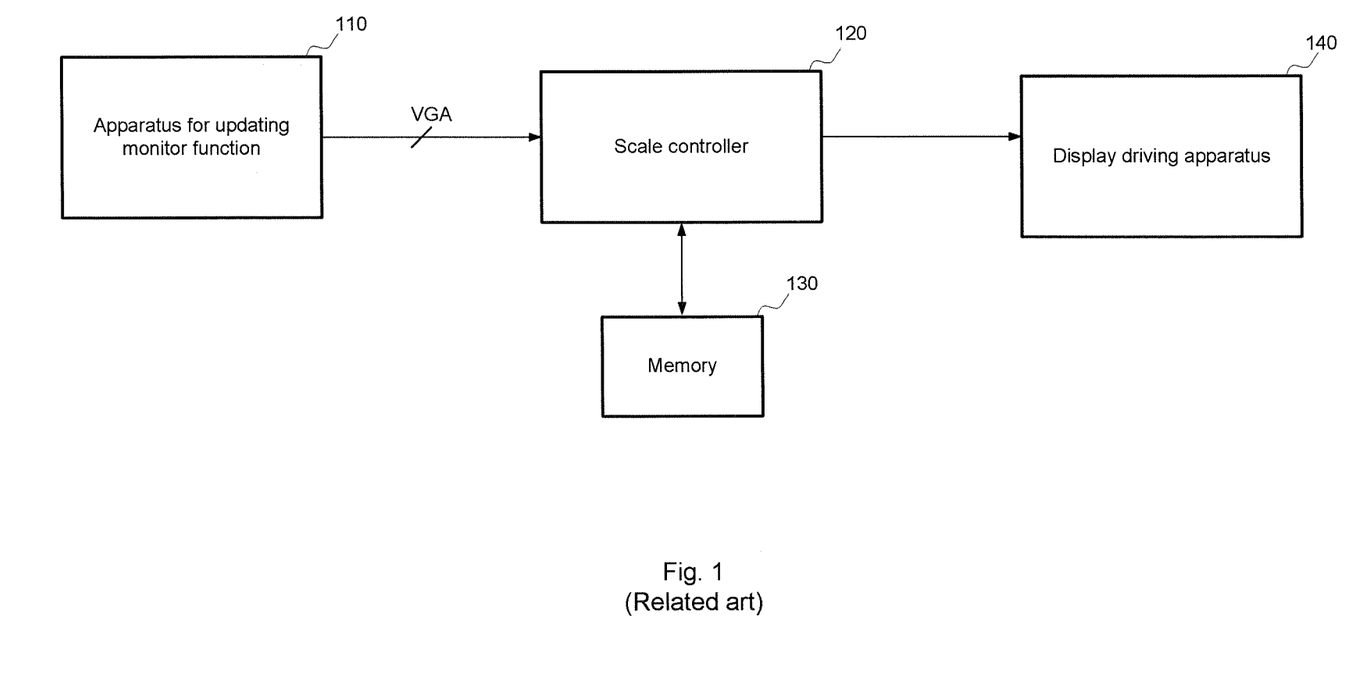
FIG. 1 is a conventional block diagram of updating the function of a monitor.

FIG. 1 illustrates a block diagram of updating the function of a monitor according to prior art. An apparatus 110 for updating the function (program) of a monitor communicates with a scale controller 120 through a Video Graphics Array (VGA) signal transmission line, and thereby updates the system program stored in a memory device 130. When the scale controller 120 is in a normal state of display control, rather than a state of updating program, the scale controller 120 executes the program stored in the memory device 130 to process the VGA signal, and then sends a control signal to a display driving apparatus 140, such that the image data transmitted via the VGA signal is displayed on the display panel normally. On the other hand, when being in the state of updating program, the scale controller 120 ceases outputting the control signal to the display driving apparatus 140, and receives the burning data and the burning command from the apparatus 110. The burning data and the burning command are transmitted to the scale controller 120 through an inter-integrated circuit (I2C) bus. The scale controller 120 decodes the burning command, and then writes the burning data into the memory device 130 in a proper address to update the system program. However, with the burning data and the burning command transmitted via the I2C bus, only the system program of one single monitor can be updated. Therefore, in case a large number of monitors need their programs to be updated, it will cost plenty of time.

SUMMARY OF INVENTION

It is therefore a primary objective of the claimed invention to provide an apparatus and method capable of updating functions of a plurality of monitors at the same time or updating the function of a single monitor at a time.

According to an embodiment of the claimed invention, a system for updating the function of a monitor is disclosed. The system comprises a programming module, at least a display control circuit, and at least a first connector. The programming module comprises a first microcontroller and a first memory device. The first memory device is coupled to the first microcontroller for storing updating program codes. The display control circuit of the monitor comprises a scale controller and a second memory device, and the second memory device is coupled to the scale controller for storing control program codes of the monitor. The first connector is for connecting the first microcontroller of the programming module and the scale controller of the display control circuit. Before updating the function of the monitor, the first microcontroller sends a programming activation signal in a first signal format to the scale controller, such that the scale controller enters a state of updating program accordingly, then the first microcontroller accesses the second memory device through a signal in a second signal format to delete the control program codes and write the updating program codes into the second memory device, so as to update the function of the monitor.

According to another embodiment of the claimed invention, a method for updating the function of a monitor is disclosed. The method comprises: (a) coupling a scale controller and a memory device of at least a monitor to a microcontroller; (b) controlling the microcontroller to send a programming activation signal in a first signal format to the scale controller, such that the scale controller enters a state of updating program accordingly; and (c) controlling the microcontroller to access the memory device through a signal in a second signal format to update program codes stored in the memory device, so as to update the function of the monitor.

According to still another embodiment of the claimed invention, an apparatus for updating the function of a monitor is disclosed. The apparatus comprises a microcontroller, a memory device, and at least a first connector. The memory device is coupled to the microcontroller for storing a program code. The first connector is coupled to the microcontroller for connecting the monitor. Before updating the data stored in a memory of the monitor, the microcontroller sends a programming activation signal in a first signal format to the monitor, such that the monitor enters a state of updating program accordingly, then the microcontroller reads the program codes stored in the memory device and accesses the memory of the monitor through a signal in a second signal format to update the data stored in the memory data of the monitor.

According to still another embodiment of the claimed invention, a scale controller of a monitor is disclosed. The scale controller comprises a microcontroller coupled to a memory device. The microcontroller is for executing program codes stored in the memory device to execute the function of the monitor. When the scale controller receives a programming activation signal in a first signal format, the scale controller enters a state of updating program accordingly, and then the scale controller receives a signal in a second signal format such that an external circuit accesses the memory device through the signal to update the program codes stored in the memory device.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 2:
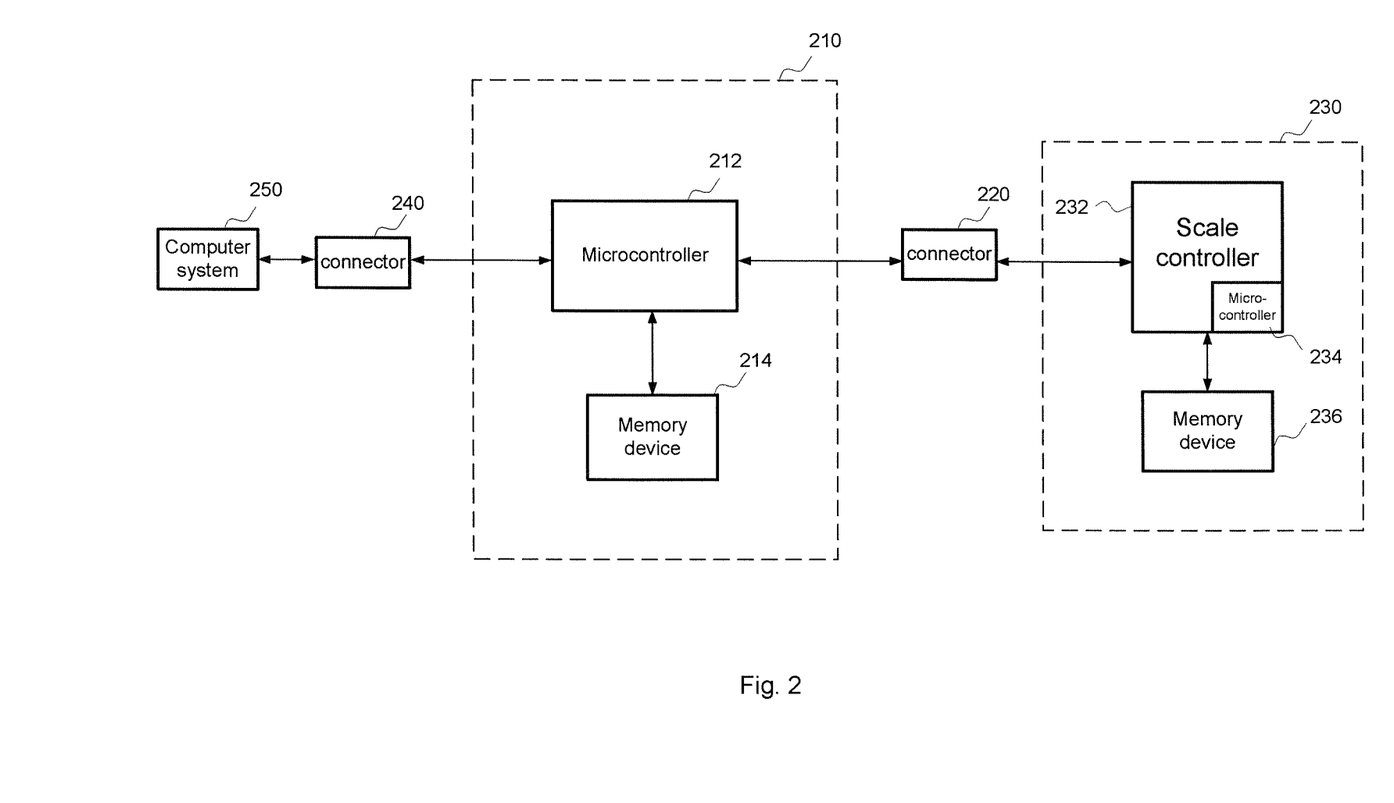
FIG. 2 is a block diagram of a system for updating the function of a monitor according to a first embodiment of the claimed invention.

FIG. 2 illustrates a block diagram of a system for updating the function of a monitor according to a first embodiment of the claimed invention. A display control circuit 230 of a monitor comprises a scale controller 232 and a memory device 236, and the scale controller 232 further comprises a microcontroller 234. Please note that the memory device 236 could be outside the scale controller 232 (as shown in FIG. 2), or built in the scale controller 232. In this embodiment, the memory device 236 is shown as an external device of the scale controller 232 for an illustrative example; however, the operation for a built-in memory device is the same.

When the scale controller 232 is in the normal state of display control, the scale controller 232 receives an image signal via a connector 220, and the microcontroller 234 executes a control program code stored in the memory device 236 to control the scale controller 232 to process the image signal. Then, the scale controller 232 sends a control signal to a driving circuit of the monitor, such that the image data transmitted via the image signal are displayed on the monitor normally.

The connector 220 could be a digital visual interface (DVI) connector, a video graphics array (VGA) connector, or a 4-pin or 6-pin head connector which is used exclusively for updating the function of the monitor. The memory device 236 is usually a flash memory, more specifically, a serial peripheral interface (SPI) flash memory that could be accessed via SPI signal.

On the other hand, an in system programming (ISP) module 210 comprises a microcontroller 212 and a memory device 214. An updating program code stored in the memory device 214 is used for replacing the control program code to update the function of the display control circuit 230. The microcontroller 212 of the ISP module 210 is coupled to the scale controller 232 via the connector 220.

Figure 3:
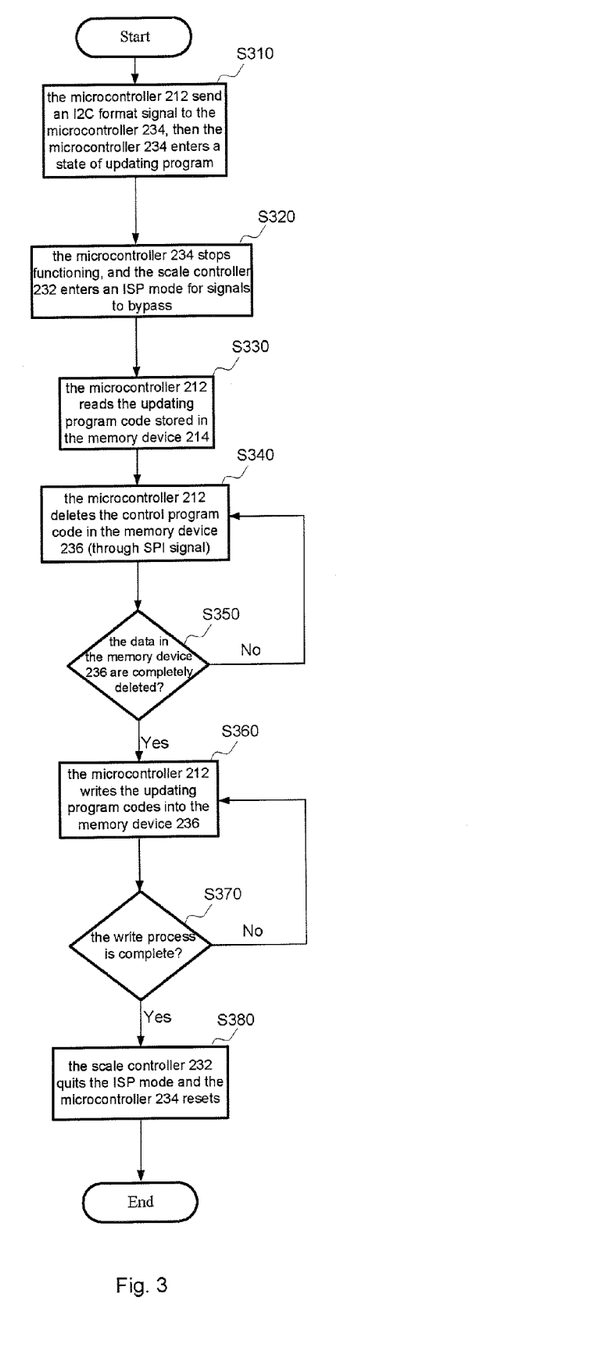
FIG. 3 is a flow chart of the method for updating the function of the monitor according to the first embodiment of the claimed invention.

FIG. 3 illustrates a flow chart of the method for updating the function of the monitor according to the first embodiment of the claimed invention. When the process is initiated, the microcontroller 212 sends a programming activation signal in a first signal format, such as an inter-integrated circuit (I2C) format, to the scale controller 232, such that the microcontroller 234 of the display control circuit 230 enters the state of updating program, accordingly (S310). The microcontroller 234 therefore stops functioning, and the scale controller 232 enters an ISP mode. In the ISP mode, the memory device 236 can be accessed by signals directly transmitted from the connector 220 to the memory device 236; that is, the scale controller 232 is in a bypass mode (S320).

Next, the microcontroller 212 reads the updating program code stored in the memory device 214 (S330). Then, the microcontroller 212 accesses directly the memory device 236 via an SPI format signal. Before the updating program codes are written into the memory device 236, the control program codes originally stored in the memory device 236 are deleted. (S340).

Next, the microcontroller 212 determines whether the deletion of the data in the memory device 236 is complete (S350). If the deletion isn't complete, then returning to the step S340, the microcontroller 212 continues executing the deletion until the deletion is complete. If the deletion is complete, the microcontroller 212 writes the updating program codes into the memory device 236 through SPI signal (S360). And during the writing process, the microcontroller 212 detects whether the updating program codes are completely written into the memory device 236. (S370). If the updating program codes are not completely written into the memory device 236, then returning to the step S360, microcontroller 212 continues the writing process. If the updating program codes are completely written into the memory device 236, the scale controller 232 quits the ISP mode, and the microcontroller 234 resets; therefore the scale controller 232 returns to the normal state of display control and ends the bypass mode (S380).

Referring to FIG. 2, the microcontroller 212 of the ISP module 210 is coupled to a computer system 250 via a connector 240. The connector 240 could use a regular RS-232 interface. Through the connector 240, the computer system 250 can access the memory device 214 to update the program codes thereof, which greatly facilitates the step of updating the program codes.

Figure 4:
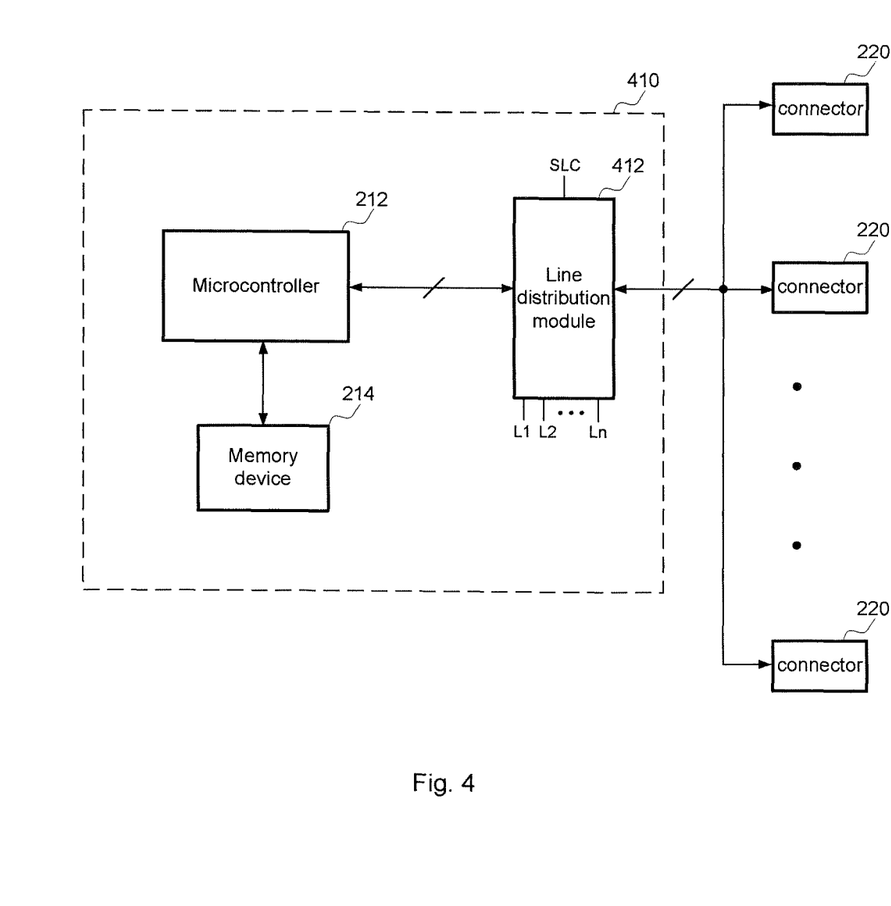
FIG. 4 is a block diagram of a system for updating functions of a plurality of monitors according to a second embodiment of the claimed invention.

FIG. 4 illustrates a block diagram of a system for updating functions of a plurality of monitors according to a second embodiment of the claimed invention. In addition to the microcontroller 212 and the memory device 214, the ISP module 410 further comprises a line distribution module 412. Moreover, the connectors 220 are couple to respective display control circuit 230 of the monitor. When two or more monitors need their functions to be updated at the same time, the line distribution module 412 is responsible for coupling properly the input/output signals to the connectors 220. More specifically, as described in the step S340, the microcontroller 212 accesses the memory device 236 of each display control circuit 230 via the SPI signal; where the SPI signal comprises a serial clock (SCK) signal, a serial data input (SDI) signal, a serial data output (SDO) signal, and a chip enable (CE) signal. When the ISP module 410 is coupled through the connectors 220 to two or more monitors at the same time, the four signals (SCK/SDI/SDO/CE) must be processed separately.

Figure 5:
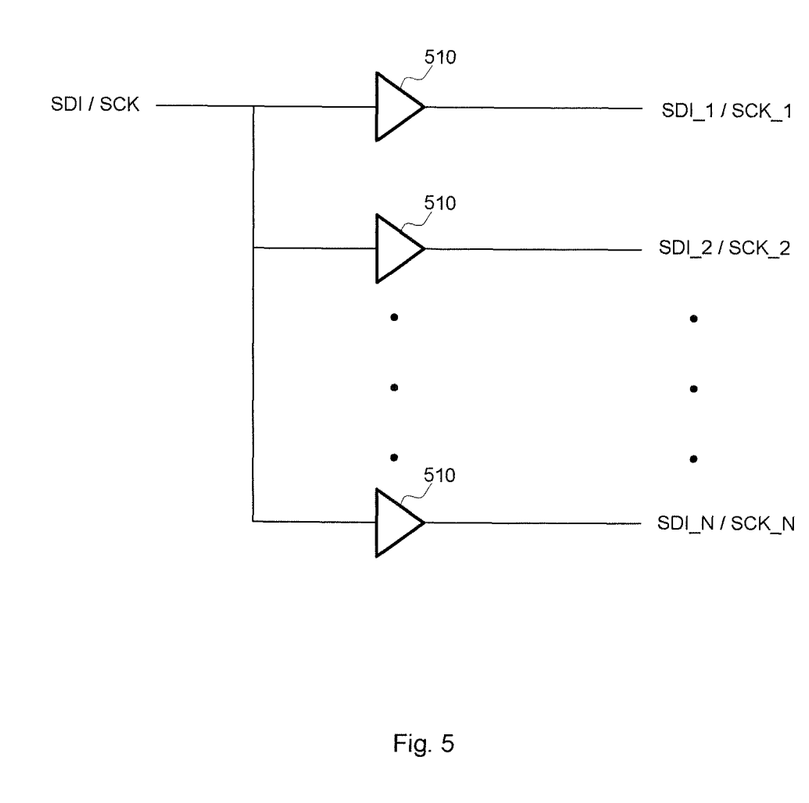
FIG. 5 is a block diagram of the buffers for enhancing the intensity of the SCK/SDI signals.

FIG. 5 illustrates a block diagram of the buffers for enhancing the intensity of the SCK/SDI signals. In implementation, because the SCK/SDI signals are unidirectional input signals to the memory device 236 of each monitor, the SCK/SDI signals can be copied and then the intensity of each signal is enhanced through the buffers 510. As shown in FIG. 5, the SCK/SCI signals are made N copies, which are SDI_1~SDI_N and SCK_1~SCK_N, where N is a positive integer.

Figure 6:
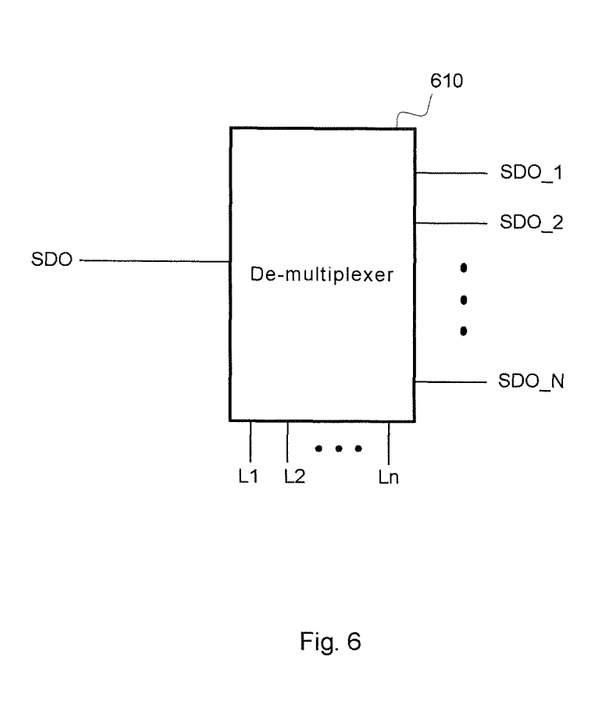
FIG. 6 is a diagram of a de-multiplexer for separating the SDO signal.
Figure 7:
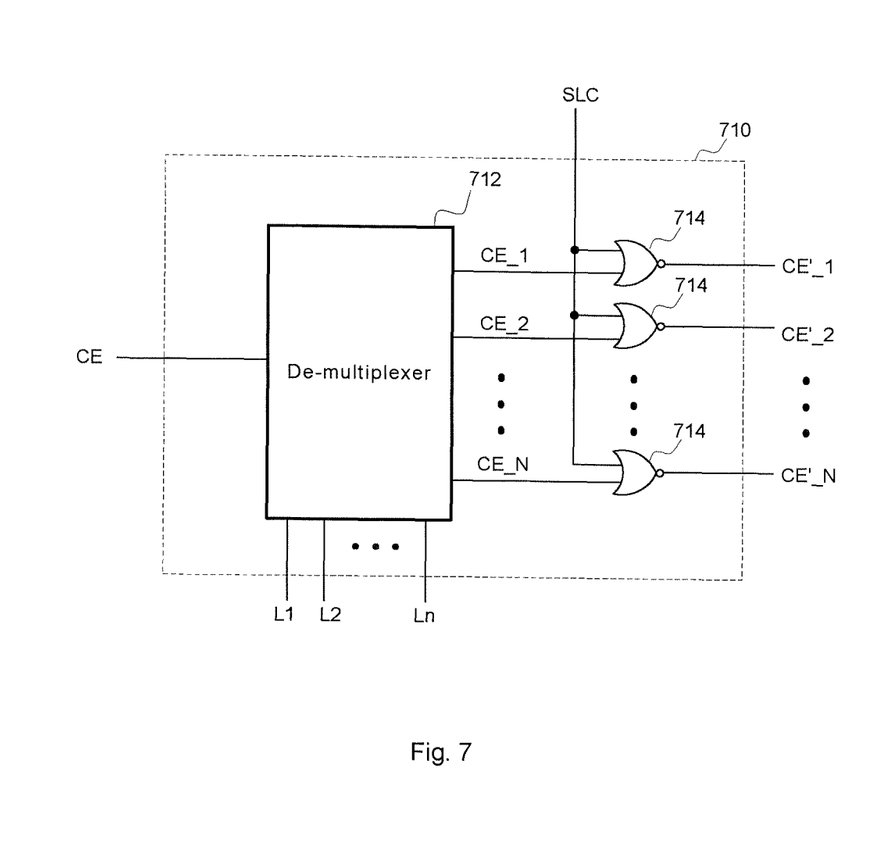
FIG. 7 is a diagram of the selecting circuit in the line distribution module 412.

FIG. 6 illustrates a diagram of a de-multiplexer for separating the SDO signal. Because the SDO signals are output signals of the memory device 236 of each monitor, they must be separated to avoid conflict among one another. After the input terminal of the de-multiplexer 610 receives the SDO signal, the SDO signal is outputted from one of the output terminals SDO_1~SDO_N according to the selection of the signals L1~Ln, where n is a positive integer and $2^n \geq N$. Besides, the line distribution module 412 further comprises a selecting circuit. FIG. 7 illustrates a diagram of the selecting circuit. The selecting circuit 710 is for determining whether all of the monitors are to be updated at the same time or only one monitor is to be updated by the ISP module 410 according to the CE signal and a selecting signal SLC. As shown in FIG. 7, the selecting circuit 710 comprises a de-multiplexer 712.

The de-multiplexer 712 is for receiving the CE signal and outputting the CE signal from one of the output terminals CE_1~CE_N according to the selection of the signals L1~Ln, where n is a positive integer and $2^n \geq N$ as describe above.

The selecting circuit 710 further comprises N NOR gates 714. One input terminal of each NOR gate 714 is coupled to one of the output terminals CE_1~CE_N correspondingly. Another input terminal of each NOR gate 714 is coupled to the selecting signal SLC. If the selecting signal SLC is at a high level (a logic value "1"), CE'_1~CE'_N are at a low level (a logic value "0"), indicating that all of the monitors are updated at the same time. If the selecting signal SLC is at the low level, it indicates that only one of the monitors is updated at a time, and the monitor to be updated is selected by the signals L1~Ln.

Hence, under the control of the line distribution module 412, the ISP module 410 can update the functions of a plurality of monitors at the same time or update one monitor at a time. In addition, the microcontroller 212 of the ISP module 410 in the second embodiment can also communicate with a computer system via the connector 240 to obtain the updating program codes in the same manner as the first embodiment.

In summary, according to the present invention the apparatus for updating the function of at least a monitor is coupled to one or more monitors via the VGA or DVI interfaces, and updates the functions of the monitors by the I2C and SPI signals. Moreover, with the property of the SPI signal, the application of a line distribution module makes it feasible to update several monitors at the same time or update one monitor at a time, which greatly facilitates the process of updating the monitors.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A system for updating the function of a monitor, comprising:
    a programming module, comprising a first microcontroller and a first memory device, wherein the first memory device is coupled to the first microcontroller for storing updating program codes;
    at least a display control circuit, wherein the monitor comprises the display control circuit, and the display control circuit comprises a scale controller and a second memory device, and the second memory device is coupled to the scale controller for storing control program codes of the monitor; and
    at least a first connector, for connecting the first microcontroller of the programming module and the scale controller of the a display control circuit;
    wherein before updating the function of the monitor, the first microcontroller sends a programming activation signal in a first signal format to the scale controller, such that the scale controller enters a state of updating program accordingly, then the first microcontroller accesses the second memory device through a signal in a second signal format to delete the control program codes and write the updating program codes into the second memory device, so as to update the function of the monitor; wherein the signal in the second signal format comprises an enable signal, the system further comprising:
    a selecting circuit coupled between the first microcontroller and the first connectors, for receiving the enable signal and a selecting signal, for determining the display control circuits to be updated at the same time;
    wherein the selecting circuit comprises:
    a first de-multiplexer, for receiving the enable signal and for outputting the enable signal at one of output terminals of the first de-multiplexer;
    a plurality of NOR gates, wherein each of the NOR gates has a first input terminal coupled to one of the output terminals of the first de-multiplexer, and has a second input terminal for receiving the selecting signal, to generate output signals which are utilized to determine whether to update the display control circuits coupled to the first connectors at the same time or to update only one display control circuit;
    wherein each signal received by each one of the first input terminals is independent from other the signals received by other the first input terminals.

2. The system of claim 1, wherein the first connector is a digital visual interface (DVI) connector or a video graphics array (VGA) connector.

3. The system of claim 1, wherein the first signal format is an inter-integrated circuit (I2C) format and the second signal format is a serial peripheral interface (SPI) format.

4. The system of claim 1, wherein the scale controller comprises a second microcontroller for executing the program codes stored in the second memory device.

5. The system of claim 1, wherein the second signal format is a serial peripheral interface (SPI) format, and the output signal is a serial data output (SDO) signal.

6. The system of claim 1, further comprising:
    a second connector coupled to the programming module, for connecting the programming module to a computer system, such that the computer system accesses the first memory device through the second connector.

7. The system of claim 6, wherein the second connector uses a RS-232 interface.

8. The system of claim 1, further comprising:
    at least one memory device; and
    a second multiplexer, for separating output signals from the memory device.

9. An apparatus for updating the function of a monitor, comprising:
    a microcontroller;
    a memory device coupled to the microcontroller, for storing program codes; and
    at least a first connector coupled to the microcontroller for connecting the monitor; characterized in that
    before updating the data stored in a memory of the monitor, the microcontroller sends a programming activation signal in a first signal format to the monitor, such that the monitor enters a state of updating program accordingly, then the microcontroller reads the program codes stored in the memory device and accesses the memory of the monitor through a signal in a second signal format to update the data stored in the memory of the monitor; wherein the signal in the second signal format comprises an enable signal, and the apparatus further comprises: a selecting circuit coupled between the microcontroller and the first connector, for receiving the enable signal and a selecting signal, for determining the monitor to be updated at the same time;
    wherein the selecting circuit comprises:
    a first de-multiplexer, for receiving the enable signal and for outputting the enable signal at one of output terminals of the first de-multiplexer;
    a plurality of NOR gates, wherein each of the NOR gates has a first input terminal coupled to one of the output terminals of the first de-multiplexer, and has a second input terminal for receiving the selecting signal, to generate output signals which are utilized to determine whether to update the display control circuits coupled to the first connectors at the same time or to update only one display control circuit;

wherein each signal received by each one of the first input terminals is independent from other the signals received by other the first input terminals.

10. The apparatus of claim 9, wherein the first connector is a digital visual interface (DVI) connector or a video graphics array (VGA) connector.

11. The apparatus of claim 9, wherein the first signal format is an inter-integrated circuit (I2C) format and the second signal format is a serial peripheral interface (SPI) format.

12. The apparatus of claim 9, wherein the second signal format is a serial peripheral interface (SPI) format, and the output signal is a serial data output (SDO) signal.

13. The apparatus of claim 9, further comprising:
a second connector coupled to the microcontroller, for connecting the microcontroller with a computer system, such that the computer system accesses the memory device through the second connector.

14. The apparatus of claim 9, further comprising:
at least one memory device; and
a second multiplexer, for separating output signals from the memory device.

* * * * *